US006038355A

United States Patent [19]
Bishop

[11] Patent Number: 6,038,355

[45] Date of Patent: Mar. 14, 2000

[54] OPTICAL BUS

[75] Inventor: Wendell E. Bishop, Somerville, Mass.

[73] Assignee: Natural MicroSystems Corporation, Framingham, Mass.

[21] Appl. No.: 08/896,241

[22] Filed: Jul. 17, 1997

[51] Int. Cl.[7] ................................ G02B 6/12; G02B 6/28

[52] U.S. Cl. ................................ 385/14; 385/24; 359/159

[58] Field of Search ................................ 385/14, 15, 24, 385/47; 372/27; 359/159, 109, 154

[56] References Cited

U.S. PATENT DOCUMENTS

| | | | |
|---|---|---|---|
| 4,234,969 | 11/1980 | Singh | 455/607 |
| 4,441,181 | 4/1984 | Winzer et al. | 370/3 |
| 4,662,715 | 5/1987 | Shutterly | 350/96.16 |
| 4,818,051 | 4/1989 | Fraser | 350/96.16 |
| 4,850,044 | 7/1989 | Block et al. | 455/607 |
| 4,892,376 | 1/1990 | Whitehouse | 350/96.2 |
| 5,093,890 | 3/1992 | Bregman et al. | 385/146 |
| 5,113,403 | 5/1992 | Block et al. | 359/152 |
| 5,204,866 | 4/1993 | Block et al. | 372/27 |
| 5,245,680 | 9/1993 | Sauter | 385/24 |
| 5,500,523 | 3/1996 | Hamanaka | 250/216 |

FOREIGN PATENT DOCUMENTS 0 732 786 A1 9/1996 European Pat. Off. .

OTHER PUBLICATIONS

Research Report/Patent Search/Jun. 12, 1997.
Research Report/Literature Search/Jun. 12, 1997.
Research Report/Literature Search/Jun. 13, 1997.

*Primary Examiner*—John D. Lee
*Assistant Examiner*—Juliana K. Kang
*Attorney, Agent, or Firm*—Mintz, Levin, Cohn, Ferris, Glovsky and Popeo, P.C.

[57] ABSTRACT

Methods and apparatus for providing an optical bus between circuit boards or other devices is provided. In one aspect, the present invention features an electronic circuit assembly that includes first electrical circuitry, a first beam splitter having a primary optical axis and a secondary optical axis, a first detector having an electrical output electrically connected to the first circuitry and an optical input responsive to the secondary optical axis of the first beam splitter, a first optical source having a first optical output and a first electrical input responsive to the first electrical circuitry and wherein the secondary optical axis of the first beam splitter is responsive to the first optical output, and a second beam splitter having a primary optical axis and a secondary optical axis, wherein the first optical input of the first detector is responsive to the secondary optical axis of the second beam splitter, wherein the secondary optical axis of the second beam splitter is responsive to the first optical output of the first optical source, and wherein the primary optical axis of the first beam splitter is different from the primary optical axis of the second beam splitter.

17 Claims, 2 Drawing Sheets

OPTICAL BUS

FIELD OF THE INVENTION

The invention relates to an optical bus for communicating between electronic circuit modules in a larger electronic circuit assembly.

BACKGROUND OF THE INVENTION

It is known to provide an optical bus between circuit boards to obtain a high-bandwidth connection between them. In one type of architecture, the boards are connected in a loop with an optical repeater on each board. In another known design, an optical bus distributes a light signal to a number of receivers by providing bent fibers that allow a portion of the light propagating along them to be transmitted out of them to light detectors. Neither of these systems provides an optimal solution for optical communication between a set of circuit modules, particularly where cost, versatility, and compliance with other bus standards are important considerations.

SUMMARY OF THE INVENTION

In one general aspect, the invention features providing an optical bus through air between circuit boards connected to a backplane by an edge connector. Boards transmit optical signals along the bus and receive them from the bus. The bus can be provided through a series of holes in the circuit boards, and signals of different frequencies can be provided along the bus, which can include optical paths in opposite directions.

In another general aspect, the invention features an electronic circuit assembly that includes a beam splitter with a primary optical axis and a secondary optical axis, and a detector with an output connected to electrical circuitry and an optical input responsive to the secondary optical axis. The assembly also includes an optical source with an electrical input responsive to the circuitry, and the secondary optical axis of the beam splitter is responsive to its optical output. The beam splitter can deliver significantly less than half of the light from the primary axis to the secondary axis, such as 10% or less.

In preferred embodiments, the circuitry, the beam splitter, the detector, and the optical source are part of a circuit module, and the assembly also has another module including circuitry. a splitter, a detector having an output electrically connected to the circuitry and an input responsive to the secondary axis of the second splitter, and a source responsive to the circuitry, where the secondary axis of the second splitter is responsive to the second optical output and the primary axis of the splitters are in alignment. The first and second optical sources can transmit at different selectable frequencies, which can be jumper-selectable.

In additional preferred embodiments, the circuitry, the splitter, the detector, and the source are part of a circuit board having an edge connector, such as a printed edge connector, and the assembly also has a second board having an edge connector and a backplane having a series of backplane connectors to mate with the edge connectors in parallel on its surface. The first and second boards can each define a hole and, when they are engaged with a pair of the backplane connectors, the holes are aligned with the primary optical axes of the first and second beam splitters. The boards can be generally planar and the paths can be perpendicular to the plane of the boards. The edge connectors can include contacts for control signals and the first and second circuitry can transmit a communications data stream over the primary and secondary optical paths. The edge connectors include contacts for a computer system bus including address, data and control signals, and the circuitry can transmit a communications data stream over the optical paths. The edge connectors can include contacts for control signals and the circuitry can transmit an ATM data stream over the optical paths.

In further preferred embodiments, the assembly also includes second, third, and fourth splitters, with the primary optical axis of the third splitter being responsive to the source, the secondary axes of the first and second splitters being responsive to the third splitter, the fourth beam splitter being responsive to the first and second splitters, and the detector being responsive to the fourth splitter. The first and second splitters can be oriented in opposite directions such that light in the primary optical path of the first splitter shines in a first direction and such that light in the primary optical path of the first splitter shines in a second direction opposite the first direction. The assembly can also include a second splitter, where the optical input of the first detector is responsive to the secondary optical axis of the second splitter, where the secondary optical axis of the second splitter is responsive to the output of the first source, and where the primary optical axis of the first splitter is different from the primary optical axis of the second splitter. The first and second splitters can be oriented in opposite directions such that light in the primary optical path of the first splitter shines in a first direction and light in the primary optical path of the first splitter shines in a second direction opposite the first direction.

In another general aspect, the invention features transmitting a first optical signal at a first optical frequency, transmitting a second optical signal at a second optical frequency different from the first optical frequency, shining the first signal along a bus path, shining the second signal along the bus path, the first and second optical signals forming a bus beam in the bus path, passively separating a first portion of the bus beam out of the bus path, passively separating a second portion of the bus beam out of the bus path, detecting the first signal from the first portion of the bus beam, and detecting the second signal from the second portion of the bus beam.

In preferred embodiments, a third signal is shone along a second bus path to create a second bus beam in a direction opposite the first bus beam, a first portion of the second bus beam is passively separated out of the second bus path, and the third signal is detected from the first portion of the second bus beam. A fourth signal can also be shone along the second bus path in the second bus beam, a second portion of the second bus beam can be passively separated out of the second bus path, and the fourth signal can be detected from the second portion of the second bus beam.

Systems according to the invention can benefit from the increased bandwidth that optical communications can provide, with the addition of only a modest amount of circuitry and optical elements. This can result in a less expensive system and can leave room for additional circuitry on a given module. These cost advantages can be significant in relatively small systems where only a few modules need to communicate with each other.

Systems according to the invention are also particularly useful in applications where high-bandwidth communications need to be piggybacked onto an existing computer bus standard or where optical communications are only needed on a small portion of systems that share a standard. For example, personal computers are relatively inexpensive platforms that can be used for a variety of different of functions, many of which do not require high throughput optical communications. By providing structures according to the invention such a computer may be tailored to perform high-bandwidth communication functions without burdening its general-purpose bus standard. And because structures according to the invention may be quite compact, they need not take up as much space on a board sized to comply with the bus standard.

In addition, systems according to the invention do not need to be strung together with optical fibers or cables. This can reduce installation cost and time requirements, and may avoid problems with cables being accidentally damaged or unplugged.

DETAILED DESCRIPTION OF AN ILLUSTRATIVE EMBODIMENT

Figure 1:
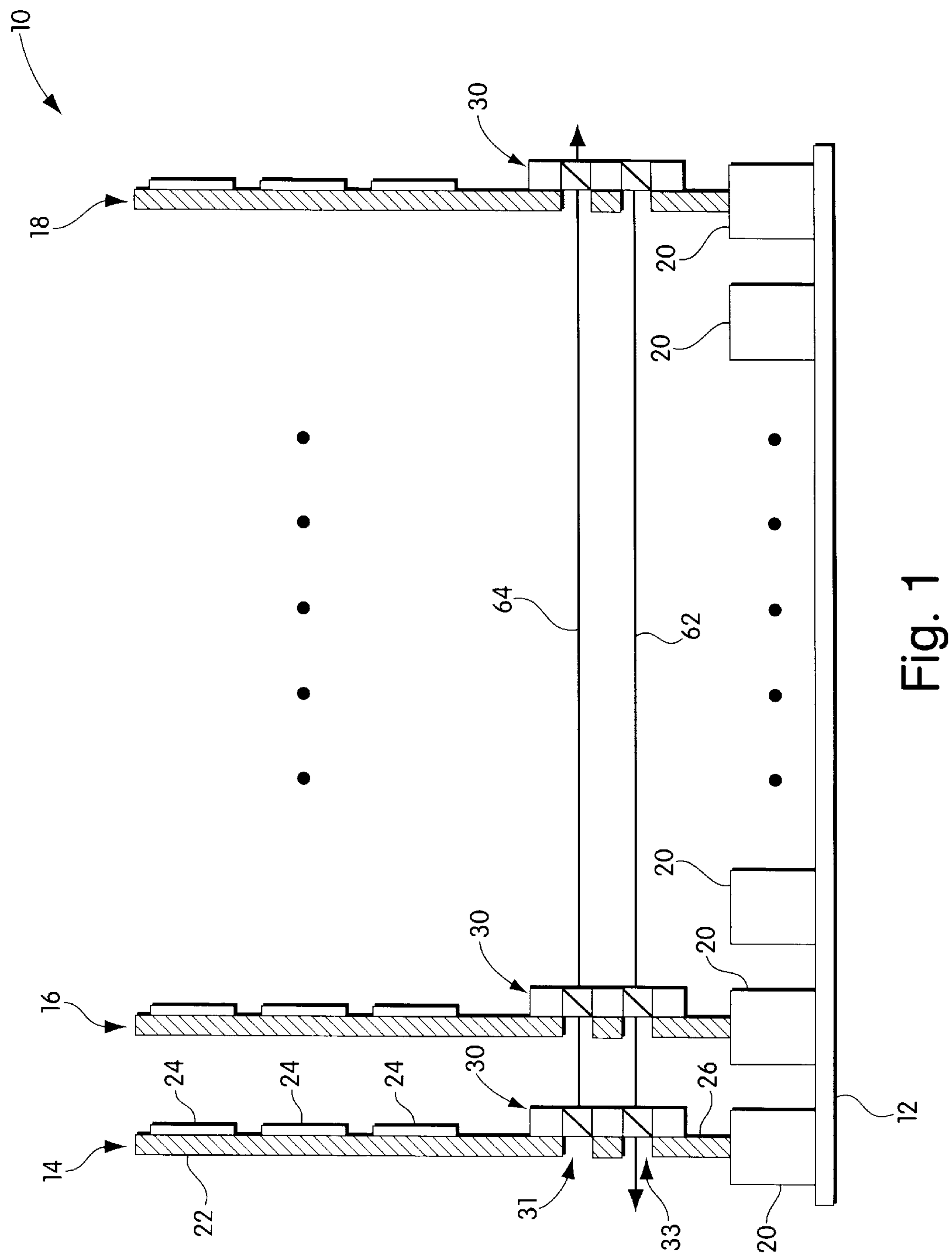
FIG. 1 is a diagrammatic side view of a circuit assembly according to the invention.

Referring to FIG. 1, an illustrative embodiment according to the invention includes a circuit assembly 10 made up of a carrier module 12 bearing daughter modules 14, 16 and 18. the carrier module can be a backplane that bears a series of connectors 20, which are usually mounted in parallel, and the daughter modules can be circuit boards. For example, one of these boards 14 can be made up of a printed circuit card 22 on which circuit components 24 are mounted to create an electronic circuit. The board includes an edge connector for connecting it to one of the connectors on the backplane. Printed edge connectors are relatively inexpensive to produce and are therefore frequently used in general-purpose bus architecture, but other methods of connecting daughter modules to a carrier module can also be used.

Figure 2:
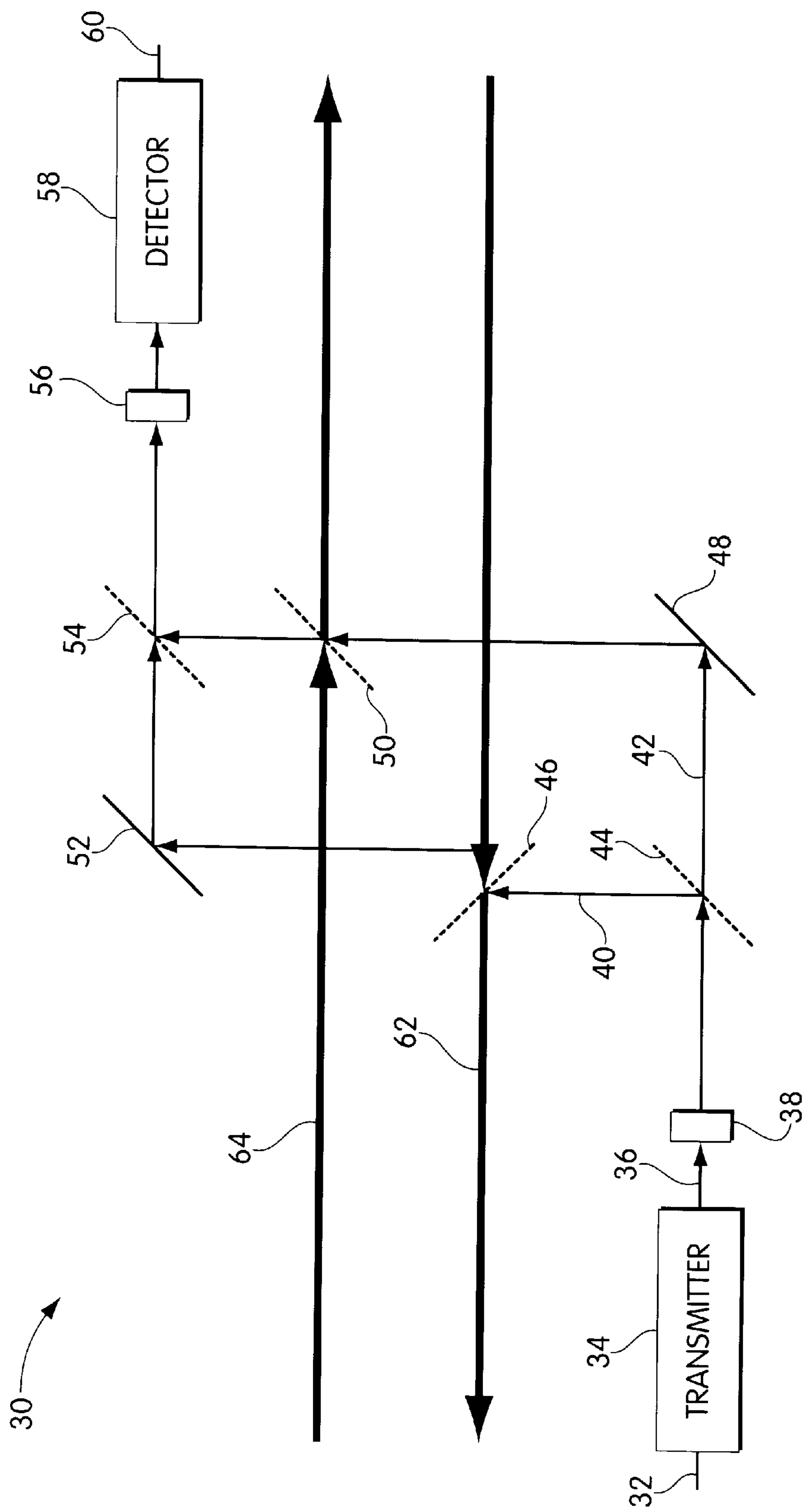
FIG. 2 is an optical diagram of an optical interface for use with the system of FIG. 1.

Referring to FIGS. 1 and 2, each daughter module 14, 16, and 18 that participates in optical communication includes an optical interface 30. This optical interface has an electrical input 32 that is provided from the circuitry of a daughter module to an optical transmitter 34. The optical transmitter has an optical output 36 provided to an expander 38, such as a lens. The beam which exits the expander is split into two output beams by a first beam splitter 44, which is preferably a 50% beam splitter. The first output beam 40 is provided to the secondary optical axis of a second beam splitter 46, while the second output beam 42 is provided to a first mirror 48, which reflects it to the secondary optical axis of a third beam splitter 50.

Each optical interface 30 also includes a second mirror 52, which is responsive to the secondary axis of the second beam splitter 46 and is placed opposite the first beam splitter 44 with respect to the second beam splitter. The reflected beam from this mirror shines through a fourth beam splitter 54 to a concentrator 56, such as a lens. The fourth beam splitter is preferably a 50% beam splitter and is also responsive to the secondary axis of the third beam splitter 50, which is between the fourth beam splitter and the first mirror 48. The concentrator 56 provides its output to an optical input of a detector 58, and the detector has an electrical output 60 connected to the circuitry of the module. The optical interfaces 30 can be made up of discrete optical parts, including detectors, transmitters, beam splitters, mirrors, and lenses, but it is preferable to integrate some or all of the components to create an interface module, which can then be added to daughter modules to provide them with optical communications capabilities.

In operation, each of the modules 14, 16, and 18 transmits signals of a different optical frequency, or color. To achieve this, different single-frequency optical transmitters 34 can be provided on each board, or multi-frequency optical sources can be configured to each transmit only on a signal frequency. In one embodiment, the communication frequency of a particular board is jumper-selectable, but it is also possible to select frequencies using other means such as non-volatile memory.

When an optical transmitter 34 on one of the daughter modules 14 receives an electrical input signal from the circuitry in that module, it generates a corresponding optical signal 36 using its frequency. This signal is expanded into a parallel beam that shines to the first beam splitter 44. The first beam splitter splits the beam into two output beams, and the first of these 40 shines to the second beam splitter 46, which reflects it into the left-going optical bus path 62. This optical bus path passes through the air between modules and through further optical interfaces of further modules to the left of the module transmitting that particular color. The second output beam 42 is reflected by the first mirror 48 to the third beam splitter 50, which reflects it into a right-going optical bus path 64. The right-going optical path communicates optical signals to the optical interfaces of daughter modules to the right of the transmitting module.

The second beam splitter 46 passively splits off a small portion (e.g., 10%) of the signal received from the left-going optical bus path 62 and the third beam splitter 50 passively splits off a small portion of the signal received from the right-going optical path 64. The second and third beam splitters 46, 50 are both asymmetric beam splitters because they reflect significantly less than half of the light passing through their primary axis to their secondary axis. Note that the second and third beam splitters also patch the two portions of the transmitted beam 40, 42 respectively into the left-going optical bus path and the right-going optical bus path.

The light extracted from the bus beams can be combined and detected. This begins with the second mirror 52 reflecting the received left-going signal portion through the fourth beam splitter 54. The received right-going received signal portion shines to the fourth beam splitter, which combines it with the left-going received signal portion and sends it on to the concentrator 56. The concentrator focuses the parallel beam to the aperture of the detector 58. The detector transduces the combined received signal portion into one or more electrical output signals 60 provided to the electrical circuits. The detector can be a multi-frequency detector which can selectively receive different wave lengths and provide corresponding outputs. By selecting one or more particular detect frequencies, each daughter module can listen to the signal of a color corresponding to one or more of the other daughter modules.

Each daughter module participating in the optical bus communications has two holes 31, 33 (e.g., ⅛–¼ in each) accurately positioned near and relative to the system bus connector, and all participating boards must be adjacent with no intervening non-optical boards. One hole is for left traveling light and the other for right traveling light. The expanders 38 each expand their beam to roughly the size of the holes and send them in both directions. Light need not necessarily pass through holes, however, but can instead pass along one side of the boards if a clear path is available.

The maximum number of boards is related to the total distance from end to end, their required alignment accuracy of the beam, and the portion of the signal loss through misalignment. While there can be a significant loss of signal when boards are separated by intervening boards, or because of misalignment, these losses are comparable to those found in relatively short runs of optical fibers.

The range of possible light intensity levels received by a board is a function of the number of boards in a system and the amount of light passed by the beam splitters in the bus path. Considering just the beam splitters in the bus path and assuming no losses, a given splitter passes a fraction F of the light incident on it and reflects the rest (1−F). The board where the signal is injected and the board where it is tapped off, each pass a fraction equal to 1−F of the signal. Each intervening board passes a fraction F equal to of the signal. The total signal passed for N intervening boards is therefore:

$$(1-F)^2 \times F^n$$

Six values of the signal passed for F=0.5 and F=0.9 and N=0, N =5 and N=10 are listed in Table 1.

TABLE 1

| |
|---|
| .25 for F = .5 and N = 0 |
| .01 for F = .9 and N = 0 |
| .0078 for F = .5 and N = 5 |
| .0059 for F = .9 and N = 5 |
| .00024 for F = .5 and N = 10 |
| .0035 for F = .9 and N = 10 |

In a bus with a few boards, a 50% beam splitter works adequately, but it is preferable to use higher values off for larger systems. Using an F=0.5 beam splitter with N=10, for example, would result in the signal to be detected being between 0.25 and 0.00024, depending on how many of the ten boards were intervening. With F=0.9, on the other hand, the range is from 0.01 to 0.0035. The latter case is therefore preferable because the detector needs to work well over a smaller dynamic range.

Note that the beam splitters and lenses can be fairly "color neutral," and that it should not matter much if the beam splitters slightly favor one color over another. Because of the optical setup, the color transmitted by a given board will appear at that board's own detector attenuated only slightly (F=0.9). All other colors from other boards will appear attenuated to fall within the range calculated above. Generally, the detector will not need to detect from its own board's transmitter, and there are different ways to determine which color or colors a given detector receives from other boards.

In one scenario, a board's detector is set to receive on only a single color. This means that this board is restricted to receiving signals from only one other board in the system at any given time. This arrangement is appropriate for systems in which all links are point-to-point from only one board to another. It is also appropriate for terminal boards in a multiplexer system where a concentrator board must receive from all the terminal boards, but where the terminal boards need only receive from the concentrator.

One way to receive on only a single color is to place a fixed or tunable filter in the optical path. Another way is to use a diffraction grating, as discussed below, and to position the detector at only that angle where the desired color is refracted.

In another scenario, a board is set to receive simultaneously on many colors. This can provide required flexibility in a truly bussed system, such as might be the case in implementing a general ATM switch where each board of ATM output might combine signals from many other boards with ATM input. And in the multiplexer system mentioned above, the concentrator board needs to detect signals from each of the terminal boards.

One way to receive on many colors simultaneously is to use a diffraction grating in which each color is refracted off at a separate angle. Multiple detectors are placed at the appropriate angle to receive each desired color. Note that because of the multiple detectors, and the additional support electronics needed to process the received signals, receiving on many colors should be implemented only as needed and not just for general flexibility.

It is observed that the system does not include any repeaters on inter-board optical cables, only an optical transmitter and detector pair along with lenses and beam splitters. This can significantly reduce the cost and board area requirements of providing optical connections between a series of boards.

In one embodiment, the boards are personal computer-based communication switching boards with standard edge connectors to connect to address, data, and control lines of a personal computer mother board. The optical communications are sent by Asynchronous Transfer Mode (ATM) protocol (e.g., SONET IOC-3 or OC-12) using a tunable LED laser, although other protocols and other types of transmitter can be used. It is contemplated that such a system could be scalable, such as an eight frequency system expandable to 64 or 512. The first eight colors of such a system could be reserved for OC-3, but some or most the colors in expanded models could be reserved for OC-12. Clocking for each color would be independent, with the transmitter determining that rate at all times.

The functionality of the optical interface need not be achieved using the exact configuration shown in FIG. 2. It is possible, for example, to provide two separate optical sources to feed the second and third beam splitters 46, 50 and thereby dispense with the first beam splitter and the first mirror. Similarly, it is possible to employ two detectors to respond respectively to the second and third beam splitters, and thereby dispense with the second mirror 52 and the fourth beam splitter 54. Other configurations which also achieve the same ends are possible. The choice of the particular implementation will depend on a variety of factors, including cost, reliability, and board area requirements.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. An electronic circuit assembly, comprising:

first electrical circuitry, a first beam splitter having a primary optical axis and a secondary optical axis, a first detector having an electrical output electrically connected to the first circuitry and an optical input responsive to the secondary optical axis of the first beam splitter, a first optical source located on a first circuit board having a first optical output to transmit an optical signal through air and a first electrical input responsive to the first electrical circuitry and wherein the secondary optical axis of the first beam splitter is responsive to the first optical output, a second beam splitter having a primary optical axis and a secondary optical axis, wherein the first optical input of the first detector is responsive to the secondary optical axis of the second beam splitter, wherein the secondary optical axis of the second beam splitter is responsive to the first optical output of the first optical source, and wherein the primary optical axis of the first beam splitter is different from the primary optical axis of the second beam splitter, and a second optical source located on a second circuit board having a second optical output and a second electrical input responsive to a second electrical circuitry.

2. The assembly of claim 1, wherein the first electrical circuitry, the first beam splitter, the first detector, and the first optical source are part of a first circuit module, wherein a second circuit module includes:

the second electrical circuitry, a third beam splitter having a primary optical axis and a secondary optical axis wherein the secondary optical axis is responsive to the second optical output, a second detector having an electrical output electrically connected to the second circuitry and an optical input responsive to the secondary optical axis of the second beam splitter, and wherein the primary optical axis of the first beam splitter and the primary optical axis of the third beam splitter are in alignment.

3. The assembly of claim 1 wherein the first optical source is constructed and adapted to transmit at a first frequency and the second optical source is constructed and adapted to transmit at a second frequency that is different from the first frequency.

4. The assembly of claim 1 wherein the first and second optical sources are constructed and adapted to transmit at different selectable frequencies.

5. The assembly of claim 4 wherein the first and second frequencies are jumper-selectable.

6. The assembly of claim 1, wherein the first electrical circuitry, the first beam splitter, the first detector, and the first optical source are part of a circuit board having a first edge connector, further including a second circuit board having a second edge connector and including:

second electrical circuitry, a third beam splitter having a primary optical axis and a secondary optical axis, a second detector having an electrical output electrically connected to the second circuitry and an optical input responsive to the secondary optical axis of the third beam splitter, and further including a backplane having a first surface and a series of backplane connectors operative to mate with the first and second edge connectors disposed in parallel on the first surface, and wherein the primary optical axis of the first beam splitter and the primary optical axis of the third beam splitter are in alignment.

7. The assembly of claim 6 wherein the edge connectors include contacts for control signals and wherein the first and second circuitry is constructed and arranged to transmit a communications data stream over the primary and secondary optical paths.

8. The assembly of claim 6 wherein the edge connectors include contacts for a computer system bus including address, data, and control signals and wherein the first and second circuitry is constructed and arranged to transmit a communications data stream over the primary and secondary optical paths.

9. The assembly of claim 6 wherein the edge connectors include contacts for control signals and wherein the first and second circuitry is constructed and arranged to transmit an ATM data stream over the primary and secondary optical paths.

10. The assembly of claim 6 wherein the edge connectors are printed edge connectors.

11. The assembly of claim 1 wherein the first and second boards each define a hole and, when the first and second edge connectors are engaged with respective ones of a pair of the backplane connectors, the holes are aligned with the primary optical axes of the first and third beam splitters.

12. The assembly of claim 11 wherein the first and second boards are generally planar and wherein the optical paths are perpendicular to the plane of the first and second boards.

13. The assembly of claim 1 wherein the first beam splitter is constructed and adapted to deliver significantly less than half of the light from the primary axis to the secondary axis.

14. The assembly of claim 13 wherein the first beam splitter is constructed and adapted to deliver 10% or less of the light from the primary axis to the secondary axis.

15. The assembly of claim 1 wherein the first and second beam splitters are oriented in opposite directions such that light in the primary optical path of the first beam splitter shines in a first direction and such that light in the primary optical path of the first beam splitter shines in a second direction opposite the first direction.

16. An electronic circuit assembly, comprising:

first electrical circuitry, a first beam splitter having a primary optical axis and a secondary optical axis, a first detector having an electrical output electrically connected to the first circuitry and an optical input responsive to the secondary optical axis of the first beam splitter, a first optical source located on a first circuit board having a first optical output to transmit an optical signal through air and a first electrical input responsive to the first electrical circuitry and wherein the secondary optical axis of the first beam splitter is responsive to the first optical output, a second beam splitter having a primary optical axis and a secondary optical axis, a third beam splitter having primary and secondary optical axes, the primary optical axis of the third beam splitter being responsive to the source and wherein the secondary axes of the first and second beam splitters are responsive to the third beam splitter, and a fourth beam splitter having primary and secondary optical axes, the fourth beam splitter being responsive to the first and second beam splitters and wherein the detector is responsive to the fourth beam splitter.

17. The assembly of claim 16 wherein the first and second beam splitters are oriented in opposite directions such that light in the primary optical path of the first beam splitter shines in a first direction and such that light in the primary optical path of the second beam splitter shines in a second direction opposite the first direction.

* * * * *

UNITED STATES PATENT AND TRADEMARK OFFICE

CERTIFICATE OF CORRECTION

PATENT NO. : 6,038,355
DATED : March 14, 2000
INVENTOR(S) : Bishop

It is certified that error appears in the above-indentified patent and that said Letters Patent is hereby corrected as shown below:

Column 5, line 15 delete " equal to " and after " signal " insert -- incident on it --.

Column 5, line 32, change the word "off" to -- of F --.

Column 6, line 29, change " most the " to -- most of the --.

Column 3, lines 28 and 29, change " 16 and 18. the " to -- 16 and 18. The --. Column 6, line 24, change "IOC" to -- OC --.

Signed and Sealed this

Sixth Day of March, 2001

Attest:

NICHOLAS P. GODICI

*Attesting Officer*

*Acting Director of the United States Patent and Trademark Office*